May 15, 1951  E. Q. DODSON  2,552,710
ROTARY VINEYARD HOE
Filed Jan. 9, 1948  2 Sheets-Sheet 1
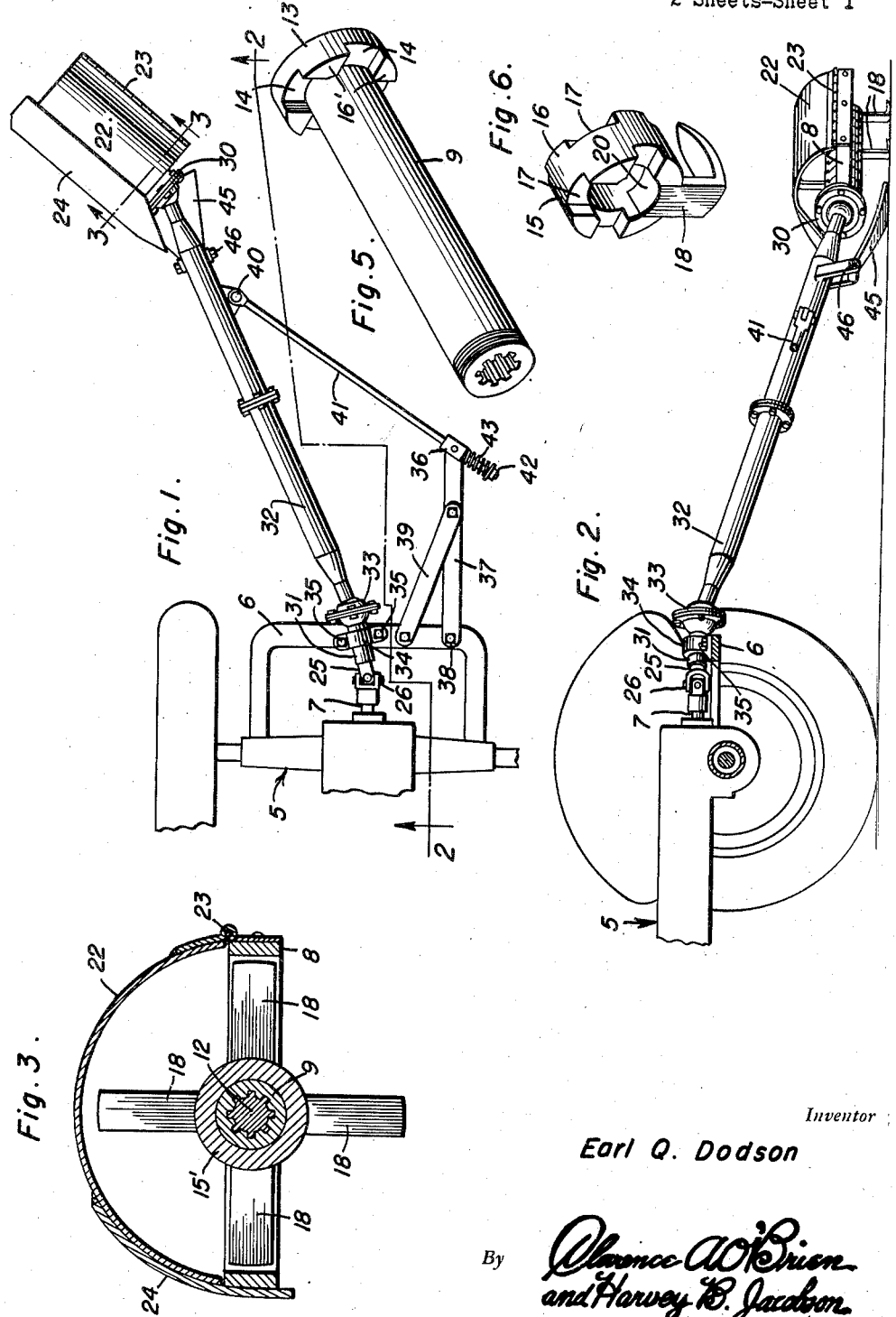
Inventor
Earl Q. Dodson May 15, 1951  E. Q. DODSON  2,552,710
ROTARY VINEYARD HOE
Filed Jan. 9, 1948  2 Sheets-Sheet 2
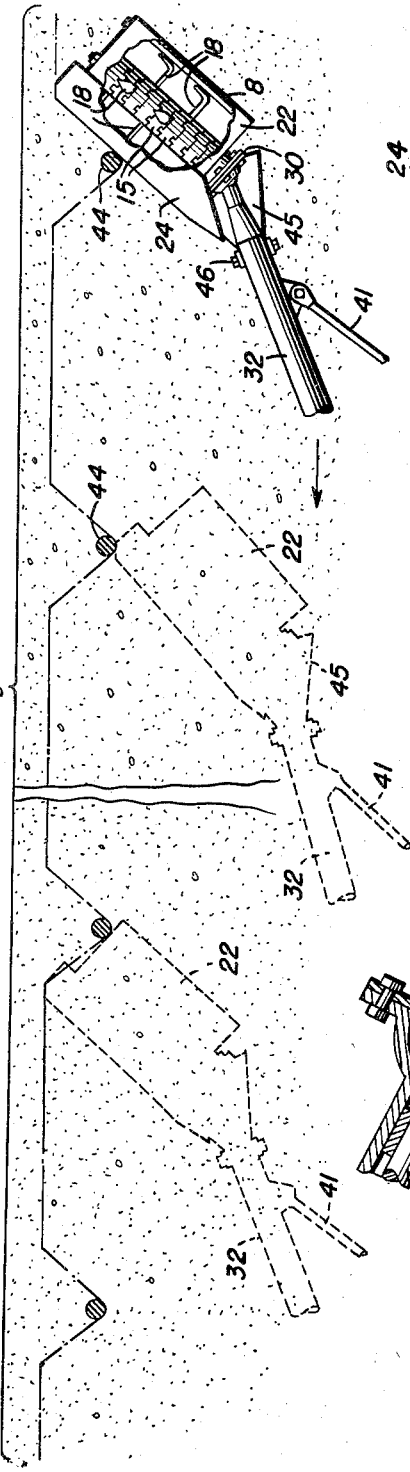
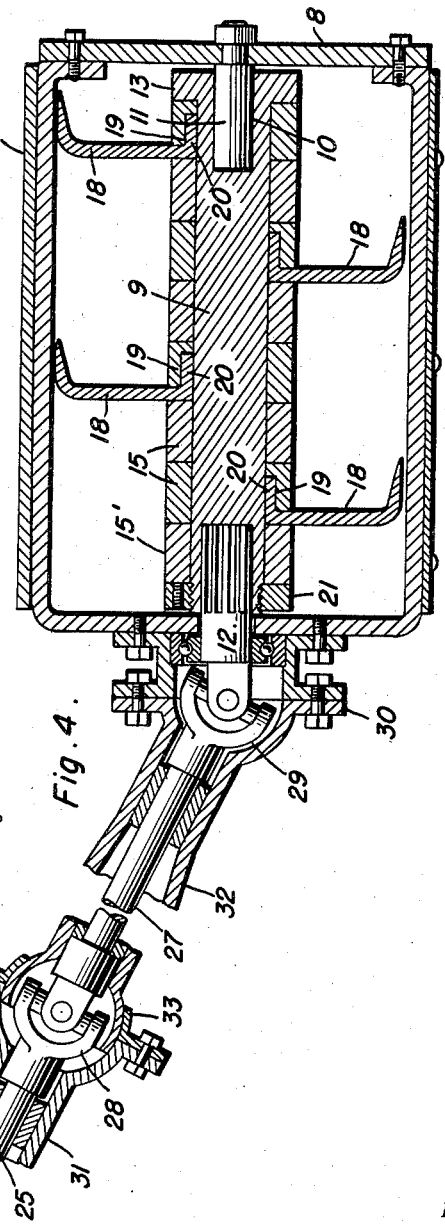
Inventor
Earl Q. Dodson Patented May 15, 1951

2,552,710

UNITED STATES PATENT OFFICE 2,552,710

ROTARY VINEYARD HOE

Earl Q. Dodson, Kingsburg, Calif.

Application January 9, 1948, Serial No. 1,365

7 Claims. (Cl. 97—137)

This invention relates to an improved cultivating machine particularly adapted for use in removing weeds and other growth from between vines and the like planted in a row.

The primary object of the invention is to provide a machine of the above kind including a rotary power driven hoe cylinder hingedly mounted in a trailing position at the back of an agricultural tractor or like motor vehicle, so as to gravitate outwardly in a lateral and forward direction to an operative position beyond a side of said vehicle for operation between the vines or the like of a row and to be freely swung inwardly in a reverse direction by contact with the trunks or stalks of the successive vines or the like in the row as the vehicle is driven ahead beside said row.

Another object of the invention is to provide a trailer hoeing attachment for tractors adapted to be mounted on the draw bar of the latter and including a frame having a rotary hoe cylinder journalled therein, a universally jointed drive shaft for said hoe cylinder adapted to be coupled to the power take-off shaft of the tractor, a universally jointed torque tube fixed to the hoe frame and housing said drive shaft and adapted to permit free gravitation of the hoe cylinder outwardly in a lateral and forward direction to operative position, and means for connecting the torque tube to the tractor draw bar to hold the torque tube and the hoe frame against rotation, to limit swinging of the hoe cylinder to the operative position, and to allow free swinging of the hoe cylinder in the opposite direction or from between the vines or the like planted in a row by contact with the trunks or stalks of the successive vines or the like in said row.

Still another object of the invention is to provide a trailer hoeing attachment for tractors which is comparatively simple in construction, durable, and efficient in operation.

The exact nature of the present invention, as well as other objects and features thereof, will become apparent from the following description when considered in connection with the accompanying drawings, and in which:

Figure 1 is a top plan view of a hoeing attachment constructed in accordance with the present invention and operatively mounted upon the rear of a tractor, Figure 2 is a longitudinal section taken on the line 2—2 of Figure 1, Figure 3 is an enlarged transverse section through the hoe, taken on the line 3—3 of Figure 1, Figure 4 is an enlarged fragmentary section, partly broken away, taken axially through the hoe cylinder and the torque tube, Figure 5 is an enlarged perspective view of the main shaft section of the hoe cylinder, Figure 6 is an enlarged perspective view of one of the hoe teeth spacing and attaching collars together with an associated hoe tooth, Figure 7 is a fragmentary somewhat diagrammatic plan view, partly broken away, illustrating the manner in which the hoe of the present invention moves into position between and out of position from between successive vines or the like planted in a row, upon forward travel of the machine.

Referring in detail to the drawings, 5 indicates the rear portion of a conventional agricultural tractor provided at the rear with a draw bar 6 and having a longitudinal rear power take-off shaft 7.

The present invention embodies a trailer hoeing attachment for the tractor embodying a hoe and mounting and driving means for the hoe cylinder of said hoe. The hoe includes a rectangular frame 8 having a hoe cylinder journalled therein, said hoe cylinder comprising a main shaft section 9 provided in one end with an axial bore 10 to be rotatably received on a stub axle 11 fixed to and projecting inwardly from one end of frame 8. At its other end, the shaft section 9 has a short stub shaft section 12 axially removably keyed therein and journalled in the other end of frame 8. At one end, the shaft section 9 is provided with an annular flange 13 provided in its inner face with a series of uniformly spaced similar radial notches or recesses 14. A plurality of collars 15 are disposed in contacting relation on the shaft section 9 substantially from end to end of the latter, said collars being provided at opposite sides with a plurality of lateral lugs 16 defining notches or recesses 17 therebetween. Similar lugs 16' are formed on the flange 13 and define the notches or recesses 14 therebetween. The notches of the flange 13 and collars 15 interfit so that a driving connection is provided between the flange 13 of shaft section 9 and said collars 15. It is noted that each collar 15 has three lugs 16 on one side thereof and four notches 17 on the other side thereof, with the notches on one side staggered relative to those on the other side. The shank of an angular hoe tooth 18 is fitted in the notch 17 at one side of each collar 15 where the next adjacent collar is provided with no lug, and each collar 15 is also provided with an internal groove 19 coincident with said notch 17 that receives the shank of hoe blade 18, which groove 19 receives the lateral extension 20 on the inner end of said hoe shank. The collars 15 are arranged so that the successive hoe blades progress in spiral fashion from one end of the hoe cylinder to the other. At the end of shaft section 9 opposite that provided with the flange 13, a further collar 15' is fitted on said shaft section 9 and has lugs interfitting with the next adjacent collar 15. A lock nut 21 is threaded on this end of shaft section 9 to compact the collars 15 and 15' and to secure them in interlocked relation. The frame 8 is provided along its free longitudinal edge portion with a rigid reinforcing or guard plate 24. The hood or cover 22 is hinged, as indicated at 23, to the frame 8 and this cover overlies the hoe blades and prevents the latter from contacting and injuring the vines or the like. It also provides a safety guard against personal injury by the blades 18, and prevents the vines from being thrown upwardly by the hoe cylinder. Upon swinging the cover 22 to open position, access may be had to the hoe cylinder for removing entangled weeds from the blades thereof.

The attachment further includes a drive shaft composed of a short section 25 having a universal joint 26 at one end for coupling the same to the power take-off shaft 7 at a lateral angle thereto, and a relatively long section 27 joined at one end to the other end of said short section 25 by universal joint 28 and joined at its other end to the hoe shaft stub section 12 by a universal joint 29. A draft member comprising a torque tube houses the drive shaft and is fixed at one end to the hoe frame at a lateral angle to the latter as at 30, said torque tube including short and long sections 31 and 32, respectively, housing the corresponding sections of the drive shaft and having a free universal joint 33 therebetween. Means is provided to fix the short torque tube section 31 on the draw bar 6, such as a clamp 34 receiving the section 31 and bolted on said draw bar as at 35. A swiveled guide 36 is mounted on the draw bar and disposed rearwardly of the latter. As shown, the guide 36 is swiveled on the rear end of a mounting bar 37 bolted at 38 to one side of the draw bar 6 and projecting rearwardly from the latter. The bar 37 is braced against lateral strains by a diagonal brace bar 39. Pivoted at one end to the torque tube section 32 adjacent the hoe, as at 40, is a torque rod 41 that slidably extends through the guide 36 and has an abutment nut 42 threaded on its free end. A helical compression spring 43 is interposed between the nut 42 and the guide 36 so as to absorb shocks resulting from swinging of the hoe, the drive shaft and the torque tube section 32 laterally and downwardly to operative position. Due to the manner in which the attachment is mounted, it normally gravitates to this operative position so that the hoe is disposed beyond one side of the tractor in position to operate between the trunks or stalks 44 of vines planted in a row as shown in Figure 7 and the reaction of the blades to the soil due to their rotation allows the hoe to enter the soil to the desired depth as limited by the adjustable shoe 45, hereinafter described more fully. At the same time, the hoe and parts movable therewith may be freely swung in the opposite direction from between said trunks or stalks by contact with the latter as illustrated by successive dotted line positions of the attachment in Figure 7, as the machine progresses ahead. It will thus be apparent that upon forward travel of the machine, the hoe will automatically enter between the vines or the like and operate to remove weeds and similar growth from between them, the hoe being forced outwardly by contact with the successive vines or the like so as to pass them and then swing in between the next adjacent vines. No operating means is required, therefore, for moving the hoe in and out between and from between the vines.

Means is provided to limit the lateral and downward movement of the hoe to operative position, such means preferably consisting of a vertically adjustable shoe or runner 45 carried by the torque tube section 32 adjacent the hoe. As shown, the shoe 45 contacts the ground and is adjustably hinged as at 46 to the torque tube section 32 by means of a friction hinge or the like. Thus, by adjustment of the shoe 45, the downward movement of the hoe may be adjustably limited so that the hoe blades may operate above or at the desired depth beneath the surface of the soil as preferred or found most desirable.

In operation, the tractor is driven ahead and the power shaft 7 is thrown in gear so as to actuate the drive shaft 25, 27. Rotation is transmitted from the drive shaft to the hoe cylinder so as to revolve the latter and cause its blades 18 to perform the desired hoeing or cultivating action. The manner in which the hoe moves in and out between and from between the vines has been previously explained, and it is believed that the construction, operation and advantages of the invention will be fully understood and appreciated by those skilled in the art. Modifications and changes in details of construction are contemplated, such as fairly fall within the spirit and scope of the invention as claimed.

Having described the invention, what I claim as new is:

1. A cultivating machine of the character described comprising a motor vehicle having a rear draw bar and a rear power take-off shaft, and a trailer hoeing device disposed obliquely of the vehicle and extending rearwardly and downwardly from said draw bar to a point beyond one side of said vehicle, said device including a hoe having a frame and a rotary hoe cylinder having a shaft journalled in said frame, a drive shaft including a short section having a universal joint at one end coupled to the power take-off shaft, and a relatively long section joined at one end to the other end of said short section by a universal joint, said long section being joined at its other end to the hoe shaft by a universal joint, a torque tube housing said drive shaft and fixed at one end to one end of the hoe frame, said torque tube including short and long sections housing the corresponding sections of the drive shaft and having a free universal joint therebetween, means to fix the short torque tube section on the draw bar obliquely of the vehicle, and means to limit movement of the hoe beyond the side of the vehicle including a swivelled guide mounted on the draw bar, and a torque rod slidable in said guide and pivoted to the long section of the torque tube adjacent the hoe.

2. The construction defined in claim 1, wherein the torque rod has an abutment on the free end thereof, and a shock absorbing spring on the torque rod between said abutment and said swivelled guide for cushioning shock incident to swinging of the hoe laterally to operative position.

3. A trailer hoeing attachment for tractors and the like, wherein the tractor or the like includes a rear draw bar and a rear power take-off shaft, comprising a rotary hoe having a frame and a hoe cylinder journaled in said frame, a universally jointed drive shaft for said hoe cylinder, means to couple said drive shaft to the power take-off shaft, a universally jointed torque tube for said drive shaft fixed at its rear end to the hoe frame, means mounting the forward end of said torque tube rigidly on the draw bar at an angle to the longitudinal axis of the tractor or the like whereby the hoe automatically gravitates outwardly in a lateral and forward direction to an operative position beyond one side of the tractor or the like and may be swung in the opposite direction by contact of the hoe with the successive ones of vines or the like planted in a row, and means interposed between and connecting the draw bar and the torque tube for holding the latter against rotation and for limiting swinging thereof to a point wherein the hoe is in said operative position.

4. The combination of a tractor having a rear draw bar, a draft member disposed obliquely of and extending to one side of the tractor, said draft member including a short obliquely disposed front section fixed on the draw bar and a relatively long rearwardly inclined rear section connected at its front end to the rear end of the front section for free universal movement relative thereto, a rotary hoe having a frame fixed at one end to and extending outwardly and rearwardly from the rear end of said draft member, a swivelled guide mounted on and disposed rearwardly of the draw bar near the other side of the tractor, and an obliquely disposed torque rod having its forward end portion slidably extended through said guide and having its rear end pivoted to the draft member adjacent the hoe.

5. The combination of a tractor having a rear draw bar, a draft member disposed obliquely of and extending to one side of the tractor, said draft member including a short obliquely disposed front section fixed on the draw bar and a relatively long rearwardly inclined rear section connected at its front end to the rear end of the front section for free universal movement relative thereto, a rotary hoe having a frame fixed at one end to and extending outwardly and rearwardly from the rear end of said draft member, a swivelled guide mounted on and disposed rearwardly of the draw bar near the other side of the tractor, and an obliquely disposed torque rod having its forward end portion slidably extended through said guide and having its rear end pivoted to the draft member adjacent the hoe, said torque rod having an abutment on its forward end, and a helical compression spring on the torque rod between the guide and said abutment.

6. The combination of a tractor having a rear draw bar, a draft member disposed obliquely of and extending to one side of the tractor, said draft member including a short obliquely disposed front section fixed on the draw bar and a relatively long rearwardly inclined rear section connected at its front end to the rear end of the front section for free universal movement relative thereto, a rotary hoe having a frame fixed at one end to and extending outwardly and rearwardly from the rear end of said draft member, a swivelled guide mounted on and disposed rearwardly of the draw bar near the other side of the tractor, and an obliquely disposed torque rod having its forward end portion slidably extended through said guide and having its rear end pivoted to the draft member adjacent the hoe, and a vertically adjustable runner carried by the draft member adjacent the hoe.

7. The combination of a tractor having a rear draw bar and a rear power take-off shaft, a draft member disposed obliquely of and extending to one side of the tractor, said draft member being a torque tube including a short obliquely disposed front section fixed on the draw bar and a relatively long rearwardly inclined rear section connected at its front end to the rear end of the front section for free universal movement relative thereto, a rotary hoe having a frame fixed at one end to and extending outwardly and rearwardly from the rear end of said draft member, a universally jointed drive shaft operatively connecting the power take-off shaft to the hoe and extending through the torque tube, a swivelled guide mounted on and disposed rearwardly of the draw bar near the other side of the tractor, and an obliquely disposed torque rod having its forward end portion slidably extended through said guide and having its rear end pivoted to the draft member adjacent the hoe.

EARL Q. DODSON.

REFERENCES CITED

The following references are of record in the file of this patent:

UNITED STATES PATENTS

| Number | Name | Date |
|---|---|---|
| 1,028,353 | Hansen | June 4, 1912 |
| 1,145,653 | Anderson | July 6, 1915 |
| 1,698,724 | Johnston et al. | Jan. 15, 1929 |
| 1,729,073 | Johnston | Sept. 24, 1929 |
| 1,744,597 | Vasconcellos | Jan. 12, 1930 |
| 2,287,479 | Kelsey | June 23, 1942 |
| 2,379,469 | Bagan | July 3, 1945 |
| 2,402,365 | Butler | June 18, 1946 |
| 2,437,581 | Wray | Mar. 9, 1948 |
| 2,489,633 | Fulgham | Nov. 29, 1949 |